United States Patent [19]

LaViolette et al.

[11] Patent Number: 4,602,327

[45] Date of Patent: Jul. 22, 1986

[54] BUS MASTER CAPABLE OF RELINQUISHING BUS ON REQUEST AND RETRYING BUS CYCLE

[75] Inventors: William P. LaViolette; David S. Mothersole; John Zolnowsky, all of Austin, Tex.

[73] Assignee: Motorola, Inc., Schaumburg, Ill.

[21] Appl. No.: 518,494

[22] Filed: Jul. 28, 1983

[51] Int. Cl.[4] .............................................. G06F 13/14
[52] U.S. Cl. .................................................... 364/200
[58] Field of Search ............................... 364/200, 900

[56] References Cited

U.S. PATENT DOCUMENTS

| | | | |
|---|---|---|---|
| 4,208,714 | 6/1980 | Eklund et al. | 364/200 |
| 4,257,095 | 3/1981 | Nadir | 364/200 |
| 4,348,722 | 9/1982 | Gunter et al. | 364/200 |
| 4,381,542 | 4/1983 | Binder et al. | 364/200 |
| 4,390,944 | 6/1983 | Quackenbush et al. | 364/200 |
| 4,488,228 | 12/1984 | Crudele et al. | 364/200 |

Primary Examiner—James D. Thomas
Assistant Examiner—Thomas Lee
Attorney, Agent, or Firm—Anthony J. Sarli, Jr.; Jeffrey Van Myers

[57] ABSTRACT

A bus master is provided with the capability to accept a data transfer task from a CPU, which includes the performance of a predetermined sequence of data transfer operations between memory and a selected peripheral controlled by a respective controller. During any one of the operations, the bus master may be requested to relinquish the bus so that a higher priority transfer may occur or a deadlock condition resolved. In response to such request, the bus master immediately terminates the current bus cycle, but remembers the state thereof at the time of relinquishment. After the high priority transfer is completed, the bus master may be allowed to rearbitrate for use of the bus. Upon again obtaining control of the bus, the bus master restarts the bus cycle which was prematurely terminated and continues the sequence of operations as if no relinquishment had occurred.

1 Claim, 3 Drawing Figures

BUS MASTER CAPABLE OF RELINQUISHING BUS ON REQUEST AND RETRYING BUS CYCLE

BACKGROUND OF THE INVENTION

1. Field of the Invention

The present invention relates generally to devices which share the use of a communication bus or the like, and, more particularly, to a circuit for forcing the device currently controlling the communication bus to relinquish control thereof and to retry the interrupted operation at a later time.

2. Background Art

In simple data processing systems, the central processing unit communicates directly with each of the peripherals and memory circuits via direct, dedicated communication lines. In more sophisticated data processing systems, a communication bus is used to couple the central processing unit to one or more memory units, peripheral controllers, channel controllers, and the like. In some of the systems, devices other than the central processing unit are allowed to request and receive temporary control of the communication bus from the central processing unit. Typically, these "bus masters" utilize the communication bus to rapidly perform their assigned tasks, and then return control of the communication bus to the central processing unit. However, the integrity of the system can be seriously compromised if a bus master assigned a time critical task is forced to wait until the bus master currently using the bus has completed the current operation.

In the past, some systems have limited the ability of each bus master to monopolize the communication bus by allowing only a single operation to be performed during each bus grant. This single transfer technique is generally impractical in systems which incorporate the newer forms of intelligent peripheral controllers, disc controllers, and the like, which are most effective for performing burst type transfers. In the latter type of system, the system software is typically designed to restrict the size of those operations which must be performed by the bus master during a single burst of activity on the communication bus. This software limitation technique imposes substantial overhead on the system, and still does not solve the dilemma of timely servicing of time critical tasks which become active while another bus master has control of the bus.

SUMMARY OF THE INVENTION

Accordingly, it is an object of the present invention to provide a circuit for forcing a bus master to relinquish control of a communication bus, and allowing the bus master to retry the interrupted operation at a later time.

Another object of the present invention is to provide a circuit for allowing a current bus operation to be temporarily halted and later resumed, to accomodate a higher priority operation.

Still another object of the present invention is to provide a bus master capable of relinquishing a bus and retrying the interrupted operation at a later time, with a minimal amount of wasted bus activity.

These and other objects of the present invention are achieved in a bus master having bus arbitration logic for arbitrating for control of a communication bus in response to a bus request signal, providing a bus available signal upon being granted control of the bus, and releasing the control of the bus only in response to a bus release signal; bus exception logic coupled to the communication bus, for providing a normal termination signal in response to receiving a particular externally generated bus exception condition signal; and bus control logic coupled to the bus arbitration logic and to the bus exception control logic, for providing the bus request signal in response to an operation request signal, utilizing the bus to perform a selected sequence of predetermined operations in response to the bus available signal, and thereafter providing the bus release signal in response to the normal termination signal. In the bus master of the present invention, the bus exception control logic includes means for providing a relinquish and retry signal in response to receiving a second predetermined bus exception condition signal; and the bus control logic includes means responsive to the relinquish and retry signal for halting the performance of the particular operation then being performed and then providing the bus release signal, and thereafter providing the bus request signal upon termination of the relinquish and retry signal and then resuming the performance of the sequence of operations at the beginning of the particular operation which was halted when the bus arbitration logic again provides the bus available signal.

DESCRIPTION OF THE INVENTION

Figure 1:
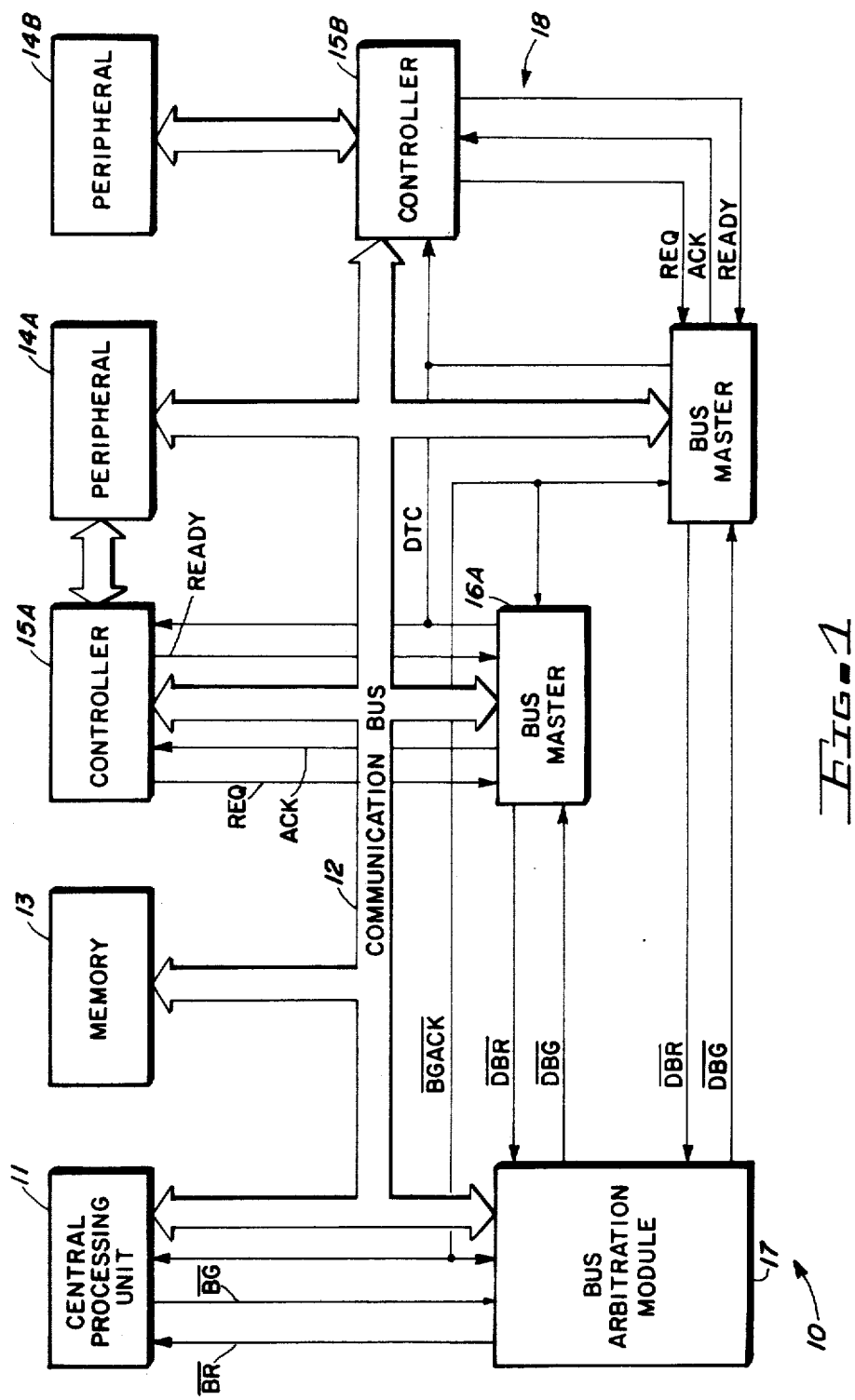
FIG. 1. is a schematic representation of a data processing system which operates according to the present invention.

In the data processing system 10 shown in FIG. 1, a central processing unit (CPU) 11 manages the utilization of a communication bus 12 to transfer information between the CPU 11, a memory 13, and a plurality of peripherals 14 and respective controllers 15. Peripheral 14A is typical of the type which is designed to directly interface to the data portion of the bus 12, but which operates under the control an associated controller 15A. In contrast, peripheral 14B is typical of the type which must be isolated from the bus 12 by the associated controller 15B as well as being controlled thereby.

In the illustrated form of the system 10, a plurality of substantially autonomous bus masters 16 arbitrate via a bus arbitration module (BAM) 17 for the right to use the bus 12 to perform data transfer tasks which are selectively assigned by CPU 11 to satisfy requirements of the supervisor or user programs. Bus master 16A is typical of the type which is restricted to using the bus 12 for performing such transfer tasks. In contrast, bus master 16B is typical of the type which is capable of exercising direct control of controller 15B via a control bus 18. However, the illustrated forms of bus masters 16A and 16B are by way of example only, since numerous configurations are possible. Of course, bus arbitration module 17 is useful only when more than one bus master 16 is present in the system 10.

In a typical operation, CPU 11 will transfer all control information necessary to define a particular data transfer task to an appropriate one of the bus masters 16 via the bus 12 and the controller 15 responsible for cooperating with the particular peripheral 14 selected to participate in the transfer task. CPU 11 will then activate the selected bus master 16 to independently perform the assigned task. Upon being activated, the bus master 16 will wait until the controller 15 signals that the peripheral 14 is properly prepared for a specific data transfer operation related to the assigned task. At this time, bus master 16 will assert a device bus request (DBR) signal requesting the right to use the bus 12 for the data transfer operation. Upon receiving a device bus request (DBR) signal, BAM 17 will assert a bus request (BR) signal to CPU 11. As soon as bus 12 becomes available, CPU 11 (typically assigned the lowest priority) will assert a bus grant (BG) signal to BAM 17. Meanwhile, other bus masters 16 may have also asserted respective device bus request (DBR) signals to BAM 17. Thus, upon receiving the bus grant (BG) signal, BAM 17 will forward a device bus grant (DBG) signal to the highest priority bus master 16 currently requesting the bus 12. This "privileged" bus master 16 will accept control of bus 12 by asserting a bus grant acknowledge (BGACK) signal and then negating the respective device bus request (DBG) signal. As long as the privileged bus master 16 continues to assert the bus grant acknowledge (BGACK) signal, neither the CPU 11 nor any other bus master 16 can obtain control of the bus 12.

Upon accepting control of the bus 12, the privileged bus master 16 can proceed to perform an appropriate data transfer operation using the bus 12. Typically, the source and destination devices being utilized by the priviliged bus master 16, e.g. memory 13 or one of the peripherals/controllers 14/15, will indicate that a particular transfer operation has been successfully completed by asserting a data transfer complete (DTACK) signal via the bus 12. Upon receiving the data transfer complete (DTACK) signal, the privileged bus master 16 can relinquish control of bus 12 by negating the bus grant acknowledge (BGACK) signal. If, upon the negation of the bus grant acknowledge (BGACK) signal, another bus master 16 is still requesting use of the bus 12, BAM 17 reasserts the bus request (BR) signal to CPU 11 and the cycle is repeated.

In the system 10, it will be assumed that the data transfer tasks assigned to one of the bus masters 16 are so much more important than the tasks assigned to the other bus masters 16 as to warrant the preempting of the latter whenever the former needs the bus 12 to perform a task. Accordingly, BAM 17 is provided with conventional prioritizing circuitry (not shown) for generating a "relinquish and retry" (RRT) bus exception code (BEC) signal via bus 12 to the currently priviliged bus master 16 upon receiving a DBR signal from a higher priority or "preemptive" bus master 16. Upon receiving the RRT/BEC signal, the priviliged bus master 16 halts the performance of the particular transfer operation then being performed, orderly terminates the current bus cycle and then releases control of the bus 12 by negating the BGACK signal. The BAM 17 then grants control of the bus 12 to the preemptive bus master 16 by asserting the respective DBG signal. Upon completion of the high priority task, the preemptive bus master 16 releases control of the bus 12 by negating the BGACK signal.

Either upon the granting of the bus 12 to the preemptive bus master 16 or upon the release of the bus 12 thereby, BAM 17 can negate the RRT/BEC signal. The preempted bus master 16 can then reassert the respective DBR signal, and rearbitrate for control of the bus 12. Upon receiving the respective DBG signal, the preempted bus master 16 resumes the performance of the interrupted sequence of operations at the beginning of the particular operation which was halted in response to the RRT/BEC signal. In this manner, the preemptive bus master 16 is allowed to perform the necessary time-critical task without forcing the preempted bus master 16 to repeat those transfer operations which had been completed before the latter relinquished control of bus 12.

In general, each data transfer task is comprised of one or more operations which must be performed in a particular sequence. Typically, each operation comprises one or more distinct states which together define the bus cycle necessary to achieve that operation. Assume, for example, that a given task requires the transfer of a single operand from memory 13 to peripheral 14A. Depending upon the configuration of the particular bus master 16 selected to perform the task, the number of operations required to do complete the task will vary.

If CPU 11 assigns bus master 16A to perform the task, two major operations are required: first, the desired operand must be fetched from the memory 13 and temporarily stored in bus master 16A; and, second, the operand must then be stored in the peripheral 14A via controller 15A. During the fetch operation, several minor operations must occur: first, bus master 16A must arbitrate for control of the bus 12; second, upon BAM 17 granting control of the bus 12, bus master 16A must provide the address of the desired operand in the memory 13 on the address portion of the bus 12; and, third, bus master 16A must latch the operand provided by the memory 13 on the data portion of the bus 12 into an operand register in bus master 16A. Since bus master 16A already has control of the bus 12, the store operation requires only two additional minor operations: first, bus master 16A must provide the address of controller 15A on the address portion of the bus 12; and, second, bus master 16A must provide the operand being held in the operand register on the data portion of the bus 12 and instruct controller 15A to store it in peripheral 14A.

In contrast, if CPU 11 assigns bus master 16B to perform the task, only one major operation is required: the desired operand can be fetched from the memory 13 and then immediately stored in the peripheral 14B via controller 15B. During this single operation, several minor operations occur: first, bus master 16B must arbitrate for control of the bus 12; second, upon BAM 17 granting control of the bus 12, bus master 16B must provide the address of the desired operand in memory 13 on the address portion of the bus 12; and third, bus master 16B must implicitly instruct controller 15B via the bus 18 to transfer the operand then available on the data portion of the bus 12 to the peripheral 14B.

Figure 2:
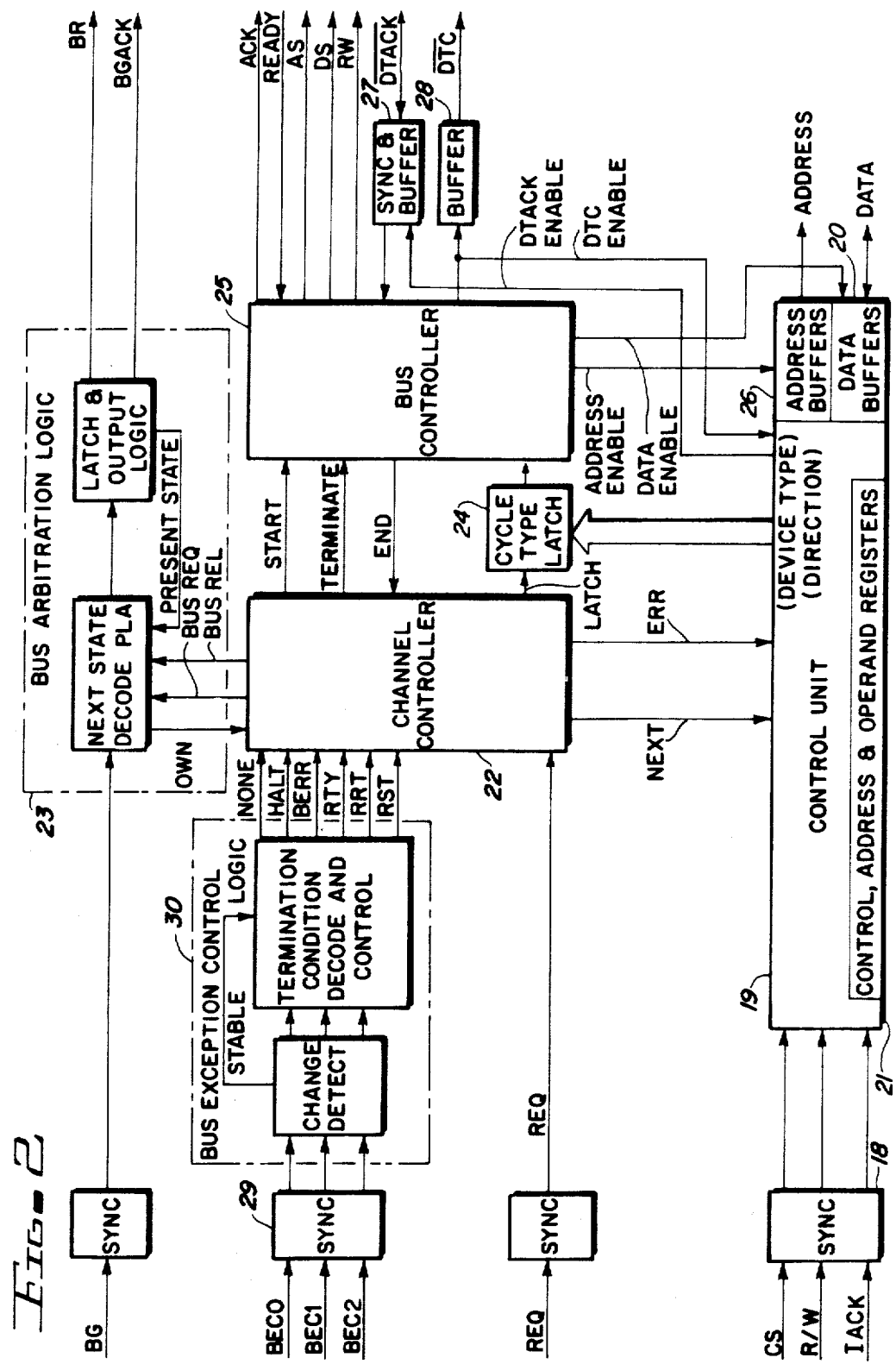
FIG. 2 is a block representation of the bus masters in FIG. 1 according to the present invention.
Figure 3:
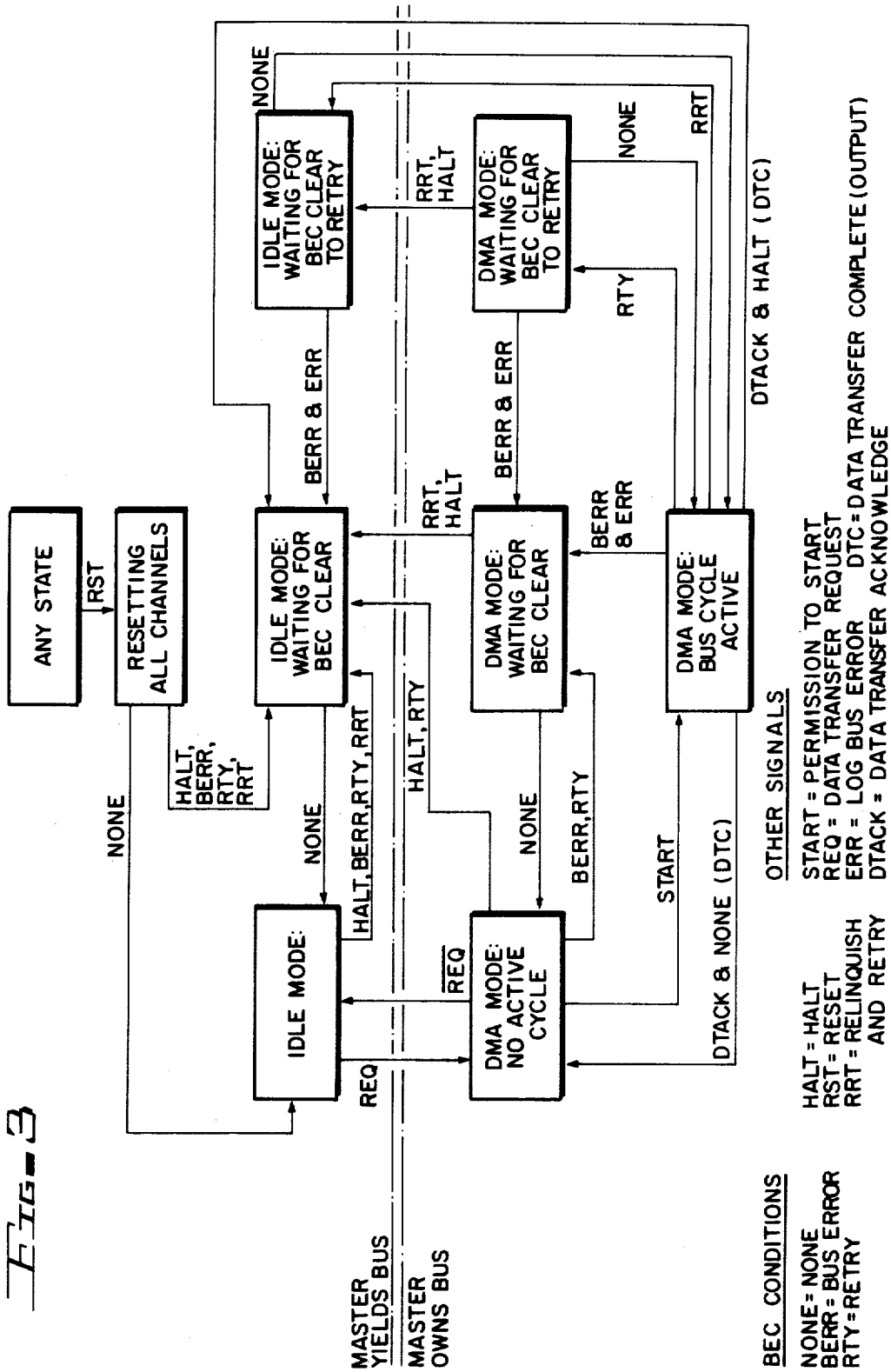
FIG. 3 is a logic state diagram for the bus control sequencer and control circuit in the bus master of FIG. 2.

Shown in FIG. 2 is a block diagram of a multipurpose bus master 16 capable of explicitly addressing peripheral 14A via controller 15A or of implicitly addressing peripheral 14B via controller 15B, depending upon the mode of operation selected by the CPU 11. In order to better understand the following description of the operation of the bus master 16 shown in FIG. 2, reference may be made to the state diagram shown in FIG. 3 which illustrates the modes of operation thereof.

In the form of the bus master 16 shown in FIG. 2, conventional address decoding circuitry (not shown) will assert a chip select (CS) signal in response to detecting that CPU 11 has issued the particular address assigned to the bus master 16 on the address portion of the bus 12. In response to receiving a synchronized form of the CS signal via synchronizer 18, control unit 19 will enable data buffers 20 to input the control information relating to a particular data transfer operation as it is provided by CPU 11. After all of the necessary parameters have been transferred into respective control and address registers 21 in control unit 19, CPU 11 will set a particular bit in one of the control registers 21 to release bus master 16 to perform the operation.

In response to being released to perform the operation, control unit 19 will check the control information to determine whether the requested data transfer operation has been properly defined. Assuming that the control information is of the proper form, bus master 16 will wait until the CPU 11 has set up the appropriate controller 15 for the requested data transfer operation. Upon detecting the assertion of a transfer request (REQ) signal indicating that the respective controller 15 is ready to cooperate with bus master 16 in the requested transfer operation, channel controller 22 will check an OWN signal provided by bus arbitration logic 23. If the state of the OWN signal indicates that the bus master 16 does not currently have control of the bus 12, the channel controller 22 will assert a bus request (BUS REQ) signal to request the bus arbitration logic 23 to arbitrate for the bus 12. Upon obtaining control of the bus 12 from BAM 17, bus arbitration logic 23 will assert the OWN signal. In response to the assertion of OWN, channel controller 22 will assert a NEXT signal to request information from control unit 19 as to the specific type of bus cycle to execute, and will thereafter assert a LATCH signal to enable cycle type latch 24 to capture the information. Typically, the control unit 19 needs to define the type of peripheral 14 which is involved, i.e. either explicitly or implicitly addressable; and the direction of transfer, i.e. either to or from the selected peripheral 14. Channel controller 22 will then assert a START signal to request bus controller 25 to run a bus cycle using the information in cycle type latch 24.

Assuming initially that the control information in cycle type latch 24 indicates that the selected data transfer operation is with an explicitly addressed peripheral 14A, bus controller 25 will initiate a read cycle by setting the state of a read/write (RW) signal on bus 12 to indicate that a read operation is to be performed, asserting an internal ADDRESS ENABLE signal to enable address buffers 26 in control unit 19 to output the address of the operand source, either the peripheral 14A or memory 13, onto bus 12 and then asserting an address strobe (AS) signal on bus 12. After an appropriate address set up time, bus controller 25 will assert a data strobe (DS) signal on bus 12 to enable the operand source to provide the requested operand on bus 12. Upon receiving a synchronized form of a data transfer acknowledge (DTACK) signal on bus 12 from synchronizer/buffer 27, indicating that the operand source has put the requested operand on bus 12, bus controller 25 will assert an internal DATA ENABLE signal to enable data buffers 20 to capture the operand on bus 12. If the operand source was peripheral 14A, bus controller 25 will then enable buffer 28 to assert a data transfer complete (DTC) signal indicating that the operand was successfully received. Upon receiving DTC, controller 15A may safely update any control information maintained internally therein regarding the transfer operation. After the assertion of DTC or if the operand source was memory 13, bus controller 25 will negate DS, AS, ADDRESS ENABLE and DTC to begin termination of the read bus cycle. In response to the negation of AS, the operand source will negate DTACK to complete the read bus cycle.

Immediately after receiving a synchronized form of DTACK from synchronizer/buffer 27, bus controller 25 will initiate a write cycle by asserting ADDRESS ENABLE to enable address buffers 26 in control unit 19 to output the address of the operand destination, either the memory 13 or the peripheral 14A, onto bus 12 and then asserting AS. Bus controller 25 then sets the state of R/W to indicate that a write operation is to be performed, asserts DATA ENABLE to enable data buffers 20 in control unit 19 to provide the operand on bus 12, and asserts DS to enable the operand destination to capture the operand on bus 12. Upon receiving a synchronized form of DTACK from synchronizer/buffer 28, indicating that the operand destination has successfully captured the operand on bus 12, bus controller 25 will assert DTC, negate DS, AS, DTC and DATA ENABLE, and again set R/W to the read state. If the operand destination was peripheral 14A, the respective controller 15A may safely update any control information maintained internally therein regarding the transfer operation upon the negation of DTC. In any event, in response to the negation of AS, the operand destination will negate DTACK to complete the write bus cycle.

Assuming now that the control information in cycle type latch 24 indicates that the selected data transfer operation is from memory 13 to implicitly addressed peripheral 14B, bus controller 25 will initiate a read cycle by setting R/W to the read state, asserting ADDRESS ENABLE to enable address buffers 26 in control unit 19 to output the address in the memory 13 of the operand, and then asserting AS followed by DS. Bus controller 25 will then assert an acknowledge (ACK) signal to notify controller 15A that the current bus cycle is in response to the last REQ signal provided thereby. In response to the assertion of DTACK by memory 13, controller 15B will transfer the operand on bus 12 to peripheral 14B. After a time period sufficient for controller 15A to complete the transfer or if controller 15A asserts a READY signal, bus controller 25 will assert DTC and then negate DS, AS, ACK and DTC. In response to the assertion of DTC, controller 15A may safely update control information relating to the transfer. In response to the negation of AS, memory 13 will negate DTACK to terminate the read cycle.

If the control information in cycle type latch 24 indicates that the selected data transfer operation is from implicitly addressed peripheral 14B to memory 13, bus controller 25 will initiate a write cycle by asserting ADDRESS ENABLE to enable address buffers 26 in control unit 19 to output the address in the memory 13 into which the operand is to be transferred, asserting AS, and then setting R/W to the write state. Bus controller 25 will then assert ACK to advise controller 15B that the current bus cycle is in response to the last REQ provided thereby. In response to the assertion of ACK, controller 15B will transfer the operand from peripheral 14B to bus 12. After an time period sufficient for controller 15B to complete the transfer or if controller 15B asserts READY, bus controller 25 will assert DS. In response to the assertion of DS, memory 13 will store the operand on bus 12 into the selected address and then assert DTACK. In response to receiving DTACK via synchronizer/buffer 27, bus controller 25 will assert DTC and then negate DS, AS, ACK and DTC. In response to the assertion of DTC, controller 15B will cease driving bus 12 and may safely update control information relating to the transfer. In response to the negation of AS, memory 13 will negate DTACK to terminate the write cycle.

Now, assume that BAM 17 decides to preempt bus master 16 during one of the bus cycles described above, by asserting RRT/BEC. Upon receiving a synchronized form of the BEC signal (which comprises signals BEC0, BEC1 and BEC2) via synchronizer 29, bus exception logic 30 will detect that the state of the BEC has changed, and allow the new state to stabilize before decoding the new state. Upon determining that the new state corresponds to the "relinquish and retry" condition, bus exception logic 30 will assert a RRT signal. In response to the RRT signal, channel controller 22 will assert a TERMINATE signal. Upon the assertion of TERMINATE, bus controller 25 will latch sufficient internal state information relating to the present bus cycle to enable the resumption of the bus cycle later. Bus controller 25 will then negate any asserted bus control signals, e.g. DS, R/W or AS, and any asserted internal enable signals, e.g. ADDRESS ENABLE or DATA ENABLE. However, since the data transfer operation was not successfully completed, bus controller 25 will not assert DTC so that controller 15 will not erroneously update the internal control information maintained therein. Bus controller 25 will then three state all bus control signals to terminate the bus cycle, and assert an END signal. In response to the END signal, channel controller 22 will negate the TERMINATE signal, and assert a bus release (BUS REL) signal. Upon the assertion of BUS REL, bus arbitration logic 23 will negate BGACK to relinquish control of bus 12, and then negate OWN.

When BAM 17 terminates the RRT/BEC signal, bus exception logic 30 will detect and decode the new state. Depending upon the new state, bus exception logic 30 will negate RRT and assert an appropriate one of several other possible condition signals. For example, if the new state indicates that no exceptions exist, bus exception logic 30 will assert a NONE signal. In response to the NONE signal, channel controller 22 will reassert the BUS REQ signal to request bus arbitration logic 23 to again arbitrate for control of bus 12. Upon the assertion of OWN, channel controller 22 will assert START and bus controller 25 will restart the bus cycle which was in progress at the time of relinquishment. In this manner, after the relinquishment, the data transfer task is resumed with the same bus cycle of the same transfer operation, without any repetition of cycles or operations.

While the invention has been described in the context of a preferred embodiment, it will be apparent to those skilled in the art that the present invention may be modified in numerous ways and may assume many embodiments other than that specifically set out and described above. For example, the present relinquish and retry mechanism may be advantageously employed in a global system having more than one local bus 12 available for use by respective local bus masters 16, to resolve a deadlock between two such local bus masters 16 which have each obtained control of the respective local buses 12 and are simultaneously seeking control of the other local bus 12 for respective transfer operations between the local systems. Accordingly, it is intended by the appended claims to cover all modifications of the invention which fall within the true spirit and scope of the invention.

We claim:

1. In a bus master comprising:

bus exception control logic coupled to a communication bus, for receiving externally generated bus exception condition signals, and providing a no-exception signal in response to receiving a first predetermined one of the bus exception condition signals and a bus relinquish and retry signal in response to receiving a second predetermined one of the bus exception condition signals;

bus arbitration logic coupled to the communication bus, for arbitrating for control of the bus in response to a bus request signal, providing a bus available signal upon being granted control of the bus, and releasing the control of the bus only in response to a bus release signal; and bus control logic coupled to the bus exception control logic and to the bus arbitration logic, for providing the bus request signal in response to an operation request signal, utilizing the bus to perform a selected sequence of predetermined, indivisible operations in response to the bus available signal, and thereafter providing the bus release signal upon receiving the no-exception signal from the bus exception control logic;

the improvement comprising means in the bus control logic for receiving the relinquish and retry signal, and, in response thereto, halting immediately the performance of the particular operation then being performed and then providing the bus release signal to the bus arbitration logic, said means thereafter providing the bus request signal to the bus arbitration logic in response to the termination of the bus relinquish and retry signal and then resuming the performance of the sequence of operations at the beginning of the particular operation which was halted when the bus arbitration logic again provides the bus available signal.

* * * * *